United States Patent [19]

Fredell et al.

[11] Patent Number: 4,666,661
[45] Date of Patent: May 19, 1987

[54] MEANS FOR COOLING A HEAT-GENERATING DEVICE

[75] Inventors: Jan Fredell; Kare Hannerz, both of Vesteras, Sweden

[73] Assignee: AB ASEA ATOM, Vasteras, Sweden

[21] Appl. No.: 644,085

[22] Filed: Aug. 24, 1984

[30] Foreign Application Priority Data

Sep. 28, 1983 [SE] Sweden .................. 8305234-0

[51] Int. Cl.$^4$ ............................................. G21C 9/00
[52] U.S. Cl. ......................................... 376/299; 376/298
[58] Field of Search ............... 376/298, 299, 310, 463; 165/70, 104.14, 104.21, 911

[56] References Cited

U.S. PATENT DOCUMENTS

| | | | |
|---|---|---|---|
| 3,098,023 | 7/1963 | Schluderberg | 165/70 |
| 4,051,892 | 10/1977 | Reinsch | 165/104.14 |
| 4,306,613 | 12/1981 | Christopher | 165/104.14 |
| 4,487,742 | 12/1984 | Bret | 376/298 |

FOREIGN PATENT DOCUMENTS

| | | | |
|---|---|---|---|
| 0111551 | 9/1978 | Japan | 165/104.14 |
| 6602176 | 8/1967 | Netherlands | 376/298 |

Primary Examiner—Deborah L. Kyle
Assistant Examiner—Richard W. Wendtland
Attorney, Agent, or Firm—Pollock, Vande Sande & Priddy

[57] ABSTRACT

A heat-generating member (4) is arranged in a water-filled pressure vessel (1) which is provided with a pressure relief valve or the like. The water of the pressure vessel can be partly evaporated, thereby acting as a heat sink for the generated heat. The walls of an outer vessel (6) surround at least a lower part of the pressure vessel (1) in such a way that a closed, relatively small auxiliary space (7) is formed between the two vessels. The auxiliary space (7) communicates via at least one tube (8) with an open evaporation pool (9), which is arranged above the cover (2) of the pressure vessel (1). A tube coil (10), disposed in an upper part of the pressure vessel, is connected by both ends to the evaporation pool (9). If a leak (13) should occur in the lower part of the pressure vessel, water from the auxiliary space flows to the evaporation pool via the tube 8 and from the evaporation pool into the tube coil (10), whereby boiling takes place in the evaporation pool (9) due to high-temperature steam condensing on the tube coil. The leakage (13), thus, does not result in a loss of the heat sink.

9 Claims, 1 Drawing Figure

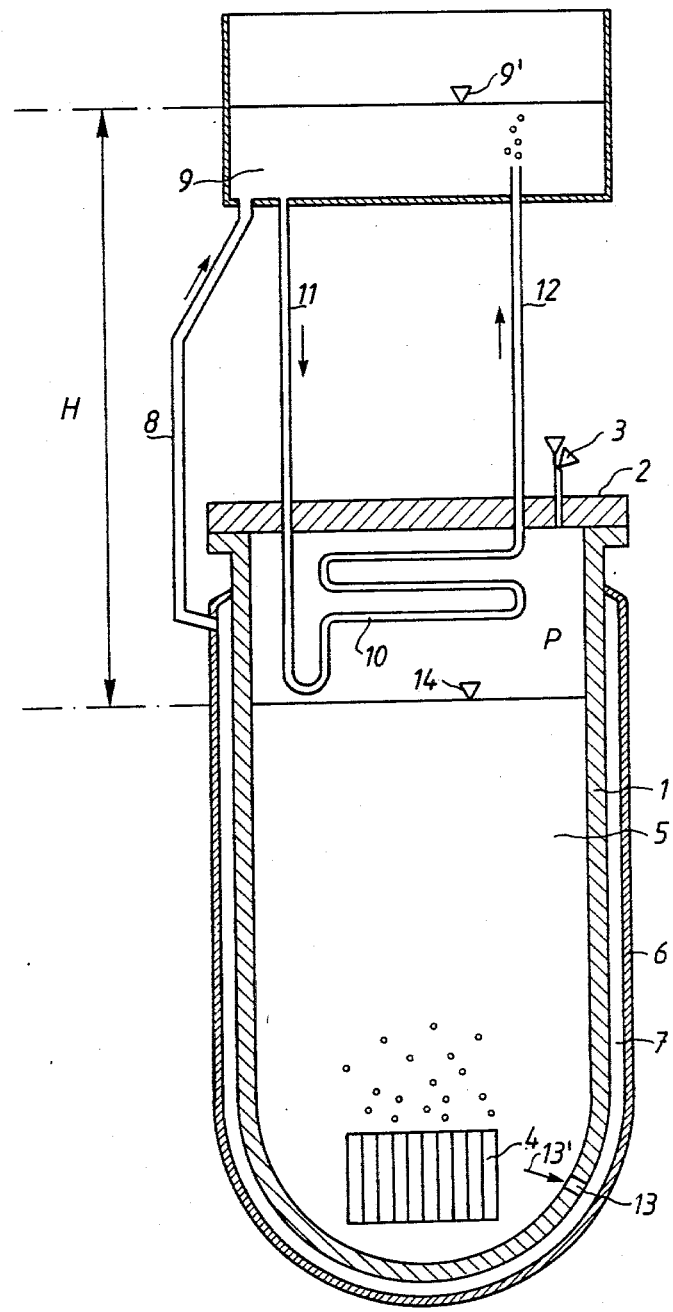

MEANS FOR COOLING A HEAT-GENERATING DEVICE

TECHNICAL FIELD

The present invention relates to a means for cooling a heat-generating device. The means comprises a pressure vessel in which most of the vessel volume not occupied by solid bodies is occupied by a liquid which constitutes a heat sink for the heat-generating device. The heat-generating device is arranged in the pressure vessel and immersed in the liquid. In particular, the invention is related to a cooling means for a nuclear reactor delivering decay power.

BACKGROUND ART

It is known that the cooling of a heat source enclosed in a pressure container—for example, a reactor core delivering decay power—can be secured for a relatively long time by filling the container with water. The power developed in the heat source is then absorbed when water is evaporated, the resulting steam being exhausted from the container via pressure relief means. However, if a rupture occurs in the lower part of the pressure container, water may leak out therethrough as liquid before its steam generating heat is utilized for cooling, the cooling ability thus being lost.

In a means according to the invention, the outer container may be designed for a pressure considerably lower than the working pressure of the inner container. The reason for this is that the water leaking out into the outer container is allowed to flow into the free air through a tube connection, namely into the open space of the evaporation pool, which is located with its bottom totally above the pressure vessel.

DISCLOSURE OF THE INVENTION

The invention aims to provide a device of the above-mentioned type in such a way that a leakage in the bottom portion of the pressure vessel does not lead to loss of the heat sink. This is achieved according to the invention by arranging an external container to capture the leakage, the volume between said container and the inner container being relatively small.

According to the invention, the means for cooling a heat generating device includes an outer vessel enclosing a pressure vessel, an evaporation pool arranged above the pressure vessel, and a cooling coil arranged in an upper portion of the pressure vessel. The outer vessel encloses the pressure vessel in such a way that a closed auxiliary space is defined between the two vessels. The auxiliary space is connected to the evaporation pool via at least one hydraulic connection member. The two ends of the cooling coil are hydraulically connected to the evaporation pool via a first and a second connection tube, respectively, passed into said pressure vessel and into said evaporation pool. A possible leakage flux of liquid from the pressure vessel to the auxiliary space would result in a supply of liquid to the cooling coil.

BRIEF DESCRIPTION OF THE DRAWING

One embodiment of the invention will be described in the following with reference to the accompanying schematic drawing, which shows a section along a vertical symmetry axis of a pressure vessel included in a means according to the invention.

DESCRIPTION OF THE PREFERRED EMBODIMENT

In the drawing 1 designates a reactor pressure vessel made of prestressed concrete and included in a nuclear reactor of the same type as described in British Pat. No. 2098786 A. The pressure vessel has a circular cross-section and is closed by means of a pressure-tightly applied circular cover 2, which is provided with a pressure relief valve 3. A reactor core 4 included in such a reactor is arranged in its entirety in the lower half, usually in the lowermost one-fourth of the vessel space 5 which is defined by means of the pressure vessel 1 and the cover 2.

For the purpose of avoiding a loss of the heat sink in the event of leakage of the pressure vessel 1, the pressure vessel 1 is surrounded by an outer vessel 6, which is dimensioned for a pressure which is less than half of the operating pressure in the pressure vessel 1. The outer vessel 6 defines, together with the pressure vessel 1, a closed auxiliary space 7 the volume of which is smaller than one-fourth of the vessel space 5, preferably smaller than one-eighth thereof. The auxiliary space 7 is hydraulically connected to an open evaporation pool 9 of circular cross-section via at least one tube 8. The evaporation pool 9 may be empty during normal reactor operation. Also the auxiliary space 7 may be empty, but it is preferably water-filled—together with the entire tube 8—or part thereof. A cooling coil 10 is arranged in the vessel space 5 near the cover 2. The cooling coil 10 is hydraulically connected to the evaporation pool 9 by means of two connection tubes 11 and 12, passed in a pressure-tight manner through the cover 2 of the pressure vessel and through the bottom of the evaporation pool, the tube 11 constituting an inlet tube and the tube 12 an outlet tube for the cooling coil 10. The tube 11 opens out near the bottom surface of the evaporation pool, whereas the tube 12 opens out into the pool at a somewhat higher level.

the reactor core 4 is arranged in a reactor vessel (not shown in the drawing), which, at its lower and upper end, is hydraulically connected to a pool liquid, for example an aqueous solution of boric acid. During normal reactor operation, this solution is prevented from entering the reactor core and the reactor core 4 is cooled by means of a coolant flow flowing through the core 4 and the reactor vessel, the maximum temperature of said coolant flow being higher than 150° C., preferably higher than 200° C. The above-mentioned pool liquid fills up a greater part of the vessel space 5 and has a mean temperature which during normal reactor operation is at least 100° C. lower than the above-mentioned maximum temperature. If a leak occurs in the wall of the pressure vessel 1, for example the leak 13 indicated by the arrow 13', the pool liquid will sink from the underside of the cover 2 to a lower level and relatively cold liquid will be supplied to the evaporation pool 9 via the tube 8. Since the level of the liquid located in the pressure vessel 1 drops, an established pressure equilibrium between pool liquid and reactor coolant is upset, resulting in the borated pool water flowing through the reactor core, the power of which is thereby reduced to the decay power. The drawing shows a state of rest, at which the volume of water pressed out through the leak 13 has resulted in an approximately equally great volume of water having been supplied to the evaporation pool 9, whereby this has been filled to the level 9', whereas the part of the vessel space 5 located above the water level 14 contains saturated water steam, the steam pressure P of which is given by the equation $$P = 1 \text{ atm} + H \cdot \rho \cdot g$$

where H is the level difference between the two levels 9' and 14, $\rho =$ is the density of the aqueous solution and $g = 9.81$ m/s$^2$. The level difference H is chosen so great that the temperature which corresponds to the saturation pressure P is considerably greater than 100° C., for example 120° C. The water located in the evaporation pool 9, on the other hand, boils at a temperature of 100° C. (disregarding the effect on the boiling point by the boron additive), and therefore the temperature of the liquid supplied to the cooling coil 10 never exceeds this temperature. The steam located above the level 14 is therefore condensed on the cooling coil 10, which thereby generates steam and emits this to the pool 9 via the tube 12. The liquid located in the evaporation pool flows by self circulation through the cooling coil 10 and starts boiling at a point which is near the pool surface 9'.

The overpressure in the pressure vessel 1 is determined by the level difference H between the levels 14 and 9'. This will adjust itself at a value which, among other things, depends on the size of the heat transfer surface of the cooling coil 10. If said surface is sufficiently large, the entire system will yield no water—only steam evaporated from the pool 9. The water lost through the leak at the bottom of the pressure 1 will therefore still serve in full as a heat sink for the cooling of the reactor core 4, whereas the outer vessel 6 need only be designed for an overpressure corresponding to the height of the liquid column to the surface of the evaporation pool as well as flow pressure drop and acceleration pressure drop. The condensing surface of the tube coil is arranged so that it cannot be blocked by possible permanent gas, which may be developed in the pressure vessel 1.

The arrangement shown in the drawing is only *one* of a great number of possible embodiments of a means according to the invention.

Thus, the means may be used with a plurality of known pool reactors—provided their pools are provided with pressure-tight covers.

Further, a means according to the invention may be used for cooling of a heat-generating device in which the heat is not generated by means of nuclear power.

Instead of one single cooling coil 10, a plurality of such coils may be used, and instead of the evaporation pool 9 shown, there may be used a pool in which the height is greater than the greatest horizontal dimension. Further, the pool may be provided with a cover, the pool space communicating with air of atmospheric pressure through at least one opening in the cover, for example an opening connected to a chimney.

We claim:

1. A means for cooling a heat-generating device, said means comprising a pressure vessel in which most of the vessel volume not occupied by solid bodies is filled up by a liquid which constitutes a heat sink for said heat-generating device, said device being enclosed in said pressure vessel, wherein said means includes an outer vessel enclosing said pressure vessel, an evaporation pool arranged above said pressure vessel, and a cooling coil arranged in an upper portion of said pressure vessel, said outer vessel enclosing the pressure vessel in such a way that a closed auxiliary space is defined between said pressure vessel and said outer vessel, said auxiliary space being connected to said evaporation pool via at least one hydraulic connection member, the two ends of said cooling coil being hydraulically connected to said evaporation pool via a first and a second connection tube, respectively, passed into said pressure vessel and into said evaporation pool, the level difference between the bottom of said evaporation pool and a normal level of liquid in said pressure vessel being such that a possible leakage flux of said liquid from said pressure vessel to said auxiliary space results in liquid being supplied to said cooling coil at a temperature which is substantially less than the temperature corresponding to the saturation pressure within said pressure vessel.

2. Means according to claim 1, wherein said first connection tube is connected to a lower end of said cooling coil, said second connection tube being connected to an upper end of said cooling coil, said first connection tube opening out into said evaporation pool at a lower level, and said second connection tube opening out into said evaporation pool at a higher level.

3. Means according to claim 1, wherein said outer vessel is designed for at least a pressure corresponding to the height of a liquid column extending from the bottom of the outer vessel to the surface of the evaporation pool as well as a flow pressure drop and an acceleration pressure drop for leakage flux of said liquid.

4. Means according to claim 1, wherein said cooling coil has a heat transfer surface of sufficient size to prevent a substantial loss of said liquid other than by evaporation from said evaporation pool.

5. Means according to claim 1, wherein said auxiliary space and said hydraulic connection member are water-filled during normal operation of said heat-generating device.

6. Means according to claim 1, wherein said heat-generating device is a nuclear reactor core.

7. Means according to claim 1, wherein said outer vessel is dimensioned for a pressure which is less than half of an operating pressure in said pressure vessel.

8. Means according to claim 1, wherein said auxiliary space has a volume which is smaller than one-fourth of the space defined by said pressure vessel.

9. Means according to claim 8, wherein the volume of said auxiliary space is smaller than one-eighth of said pressure vessel space.

* * * * *